United States Patent
Lee et al.

(10) Patent No.: US 12,266,981 B2
(45) Date of Patent: Apr. 1, 2025

(54) ROTOR AND SENSORLESS CONTROL METHOD FOR ROTOR

(71) Applicants: Hyundai Motor Company, Seoul (KR); Kia Corporation, Seoul (KR); IUCF-HYU (Industry-University Cooperation Foundation Hanyang University), Seoul (KR)

(72) Inventors: Hyo Jeong Lee, Gyeonggi-do (KR); Kyoung Ku Ha, Seoul (KR); Hong Seok Kim, Incheon (KR); Sung Il Kim, Chungcheongnam-do (KR); Young Doo Yoon, Seoul (KR); Hyun Sung Kim, Chungcheongnam-do (KR); Sang Gyu Lee, Seoul (KR); Min Seong Lee, Seoul (KR)

(73) Assignees: Hyundai Motor Company, Seoul (KR); Kia Corporation, Seoul (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 202 days.

(21) Appl. No.: 18/127,379

(22) Filed: Mar. 28, 2023

(65) Prior Publication Data

US 2024/0030764 A1 Jan. 25, 2024

(30) Foreign Application Priority Data

Jul. 14, 2022 (KR) .................. 10-2022-0087037

(51) Int. Cl.
*H02K 1/28* (2006.01)
*H02K 1/278* (2022.01)
(Continued)

(52) U.S. Cl.
CPC ............... *H02K 1/28* (2013.01); *H02K 1/278* (2013.01); *H02P 21/13* (2013.01); *H02P 21/18* (2016.02); *H02P 2207/055* (2013.01)

(58) Field of Classification Search
CPC .......... H02P 2207/055; H02P 2207/05; H02P 2203/03; H02P 2203/00; H02P 29/50;
(Continued)

(56) References Cited

U.S. PATENT DOCUMENTS 7,896,360 B2 3/2011 Buma
8,172,026 B2 5/2012 Yamazaki
(Continued)

FOREIGN PATENT DOCUMENTS

JP 4899509 B2 3/2012
KR 10-2008-0083708 9/2008
(Continued)

OTHER PUBLICATIONS

Jung Ho Kim et al. "Characteristics Comparison According to Rotor Structure of Ultra-High Speed Motors for an Air Compressor of FCEV" The 52th KIEE Summer Conference 2021.
(Continued)

*Primary Examiner* — Antony M Paul
(74) *Attorney, Agent, or Firm* — Fox Rothschild LLP

(57) ABSTRACT

Disclosed is a rotor including a sleeve part having a shape corresponding to a cylinder extending in a reference direction, and having an inner hole extending in the reference direction, in an interior thereof, a division part disposed in the inner hole, and dividing the inner hole into a first space and a second space, together with the sleeve part, a first magnet part disposed in the first space, and a second magnet part disposed in the second space, and disposed to have an opposite polarity to that of the first magnet part when viewed along the reference direction.

20 Claims, 14 Drawing Sheets

(51) Int. Cl.
*H02P 21/13* (2006.01)
*H02P 21/18* (2016.01)

(58) Field of Classification Search
CPC ...... H02P 25/089; H02P 25/28; H02P 25/064;
H02P 21/18; H02P 1/00; H02P 1/46;
H02P 6/183; H02P 21/22; H02P 21/24;
H02P 27/08; H02K 1/2791; H02K
1/2706; H02K 1/27; H02K 1/276; H02K
1/278; H02K 15/03; H02K 21/14; H02K
2201/06; H02K 21/16; H02K 7/003;
H02K 7/20; H02K 1/24; H02K 47/04;
H02K 47/14; H02K 47/20; B60L
2220/14; B60L 2220/16
See application file for complete search history.

(56) References Cited

U.S. PATENT DOCUMENTS

| | | | |
|---|---|---|---|
| 9,515,528 | B2 | 12/2016 | Yamaguchi et al. |
| 9,909,633 | B2 | 3/2018 | Tanahashi et al. |
| 10,658,962 | B2 | 5/2020 | Goetting et al. |
| 2002/0047346 | A1* | 4/2002 | Miekka ............ B60L 50/60 310/68 B |
| 2010/0147101 | A1 | 6/2010 | Yamazaki |
| 2010/0164189 | A1 | 7/2010 | Buma |
| 2016/0169232 | A1 | 6/2016 | Li |
| 2016/0230824 | A1 | 8/2016 | Tanahashi et al. |
| 2016/0254713 | A1 | 9/2016 | Yamaguchi et al. |
| 2017/0093249 | A1 | 3/2017 | Li et al. |
| 2019/0089282 | A1 | 3/2019 | Goetting et al. |

FOREIGN PATENT DOCUMENTS

| | | |
|---|---|---|
| KR | 10-2009-0092323 | 8/2009 |
| KR | 10-2016-0071349 | 6/2016 |
| KR | 10-2016-0098078 | 8/2016 |
| KR | 101701102 B1 | 1/2017 |
| KR | 10-2017-0039584 | 4/2017 |
| KR | 10-2018-0111896 A | 10/2018 |

OTHER PUBLICATIONS

Sang-Gyu Lee et al. "Initial Position Estimation and Signal Injection Sensorless Control Method of Super-High-Speed Motor for Air Compressor of Fuel Cell Systems" 2021 KIPE General Meeting & Autumn Conference.

Hyun-Sung Kim et al. "Characteristics Comparison According to Rotor Shape of an Ultra-High Speed Motor While Salient Pole Structure" The 52the KIEE Summer Conference 2021.

* cited by examiner

ROTOR AND SENSORLESS CONTROL METHOD FOR ROTOR

CROSS-REFERENCE TO RELATED APPLICATION

This application claims, under 35 U.S.C. § 119(a), the benefit of priority to Korean Patent Application No. 10-2022-0087037, filed in the Korean Intellectual Property Office on Jul. 14, 2022, the entire contents of which are incorporated herein by reference.

TECHNICAL FIELD

The present disclosure relates to a rotor, and a sensorless control method for a rotor.

BACKGROUND

In general, rotation devices mean energy conversion devices that rotate in a magnetic flux. Among them, a permanent magnet (PM) motor is a motor that uses a magnet embedded or attached on a surface of a rotor. Because the PM motor uses a permanent magnet instead of rotor winding, it is not necessary to supply electric power to the winding, whereby a high efficiency is exhibited.

Meanwhile, the PM motors may be classified into a surface permanent magnet (SPM) type and an interior permanent magnet (IPM) type. Among them, all motors having an ultra-high speed rotor structure, to which an air foil bearing is applied, utilize the SPM type.

FIG. 1 is a view conceptually illustrating a conventional SPM type motor structure. FIG. 2 is an enlarged view illustrating a dotted area of FIG. 1. FIG. 2 may be understood as enlarging a conventional rotor 1. As illustrated in FIGS. 1 and 2, in the conventional SPM type motor structure, magnetic circuit configurations of the d-axis and the q-axis are the same configurations including a shaft 5, a permanent magnet 4, a sleeve 3, and a stator 2, and thus there is no difference between inductances of the axes.

Because the conventional SPM type motor structure may cause a damage to an air foil bearing during reverse rotation thereof, a sensorless control of rotating the rotor only in a specific direction is necessary. For the sensorless control, a saliency is required.

That is, a motor having an ultra-high speed rotor structure, to which an air foil bearing is applied, requires a rotor having a saliency to prevent damage to the air foil bearing due to reverse rotation of the rotor.

SUMMARY

The present disclosure has been made to address the above-mentioned problems occurring in the prior art while advantages achieved by the prior art are maintained intact.

An aspect of the present disclosure provides a rotor having a saliency.

An aspect of the present disclosure also provides a rotor that may be rotated only in a specific direction during an initial operation thereof.

An aspect of the present disclosure provides a method for controlling an injection direction of an injection signal to accurately calculate a signal in an ultra-high speed rotation situation of a rotor.

The technical problems to be addressed by the present disclosure are not limited to the aforementioned problems, and any other technical problems not mentioned herein will be clearly understood from the following description by those skilled in the art to which the present disclosure pertains.

According to an embodiment of the present disclosure, a rotor includes a sleeve part having a shape corresponding to a cylinder and extending lengthwise in a reference direction, and having an inner hole in an interior thereof and extending in the reference direction, a division part disposed in the inner hole, and being configured to divide the inner hole into a first space and a second space, together with the sleeve part, a first magnet part disposed in the first space, and a second magnet part disposed in the second space, and wherein, when viewed along the reference direction, the second magnet part is disposed to have an opposite polarity to that of the first magnet part.

In another example, the division part may further include a first portion extending in the reference direction, having a shape corresponding to a cylinder having a diameter that is smaller than a diameter of the inner hole, the first portion having a hole extending in the reference direction, in an interior thereof, a second portion extending in a first radial direction from a first point that at an outer peripheral surface of the first portion, and a third portion extending in a second radial direction from a second point at the outer peripheral surface of the first portion, wherein the second radial direction is an opposite direction to the first radial direction.

In another example, the division part may be configured to divide the inner hole such that shapes of the first space and the second space are correspond to each other.

In another example, the first magnet part may have a shape corresponding to the shape of the first space, and the second magnet part has a shape corresponding to the shape of the second space.

In another example, the second portion and the third portion may contact an inner peripheral surface of the sleeve part, and may divide the inner hole into the first space and the second space.

In another example, a thickness of the first portion in a radial direction may be 0.9 mm to 1.1 mm, and thicknesses of the second portion and the third portion may be 1 mm to 1.5 mm.

In another example, lengths of the first portion, the second portion, and the third portion in the reference direction may correspond to each other.

In another example, the division part may further include a first division member including a portion of the first portion and the second portion, and a second division member including remaining portions of the first portion, and the third portion, and the first division member and the second division member may be formed as separate objects.

In another example, the first division member and the second division member may have corresponding shapes.

In another example, lengths of the sleeve part, the division part, the first magnet part, and the second magnet part in the reference direction may correspond to each other.

According to an embodiment of the present disclosure, a sensorless control method for a rotor includes providing a rotor, injecting a first voltage signal having a first sign, injecting a second voltage signal having a second sign that is opposite to the first sign, and estimating a location of the rotor by injecting the first voltage signal and the second voltage signal, and the second voltage signal is a signal that has a frequency that is higher than that of the first voltage signal.

In another example, the injecting of the second voltage signal may include injecting the second voltage signal to axis d-q of a stationary reference frame.

In another example, the injecting of the second voltage signal step may further include injecting a voltage signal having a frequency in a range of $1/20^{th}$ to $1/12^{th}$ of a sampling frequency.

In another example, the sensorless control method may further include extracting a basic wave component current from a measured current signal by using a low pass filter (LPF), and using a signal acquired by the low pass filter as an input signal of a current controller.

In another example, the sensorless control method may further include extracting a current of a high frequency component for estimating the location of the rotor from a measured current signal by using a band pass filter (BPF)

In another example, the sensorless control method may further include acquiring a signal including a location estimation error of the rotor by using a heterodyne method.

In another example, the sensorless control method may further include eliminating a high frequency component from the signal including the location estimation error of the rotor by using a notch filter, and estimating the location of the rotor by using a signal acquired by eliminating the high frequency component.

In another example, a calculation time period from a time point of sampling for controlling a current of the rotor to a time point for a pulse width modulation (PWM) update may be 25 μs or less. In another example, the sensorless control method may further include operating a location estimation algorithm of the rotor after the PWM update.

In another example, the sensorless control method may further include calibrating a sampling time period between an operation time point of the location estimation algorithm and a current control time point using an estimated location of the rotor to the estimated location.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
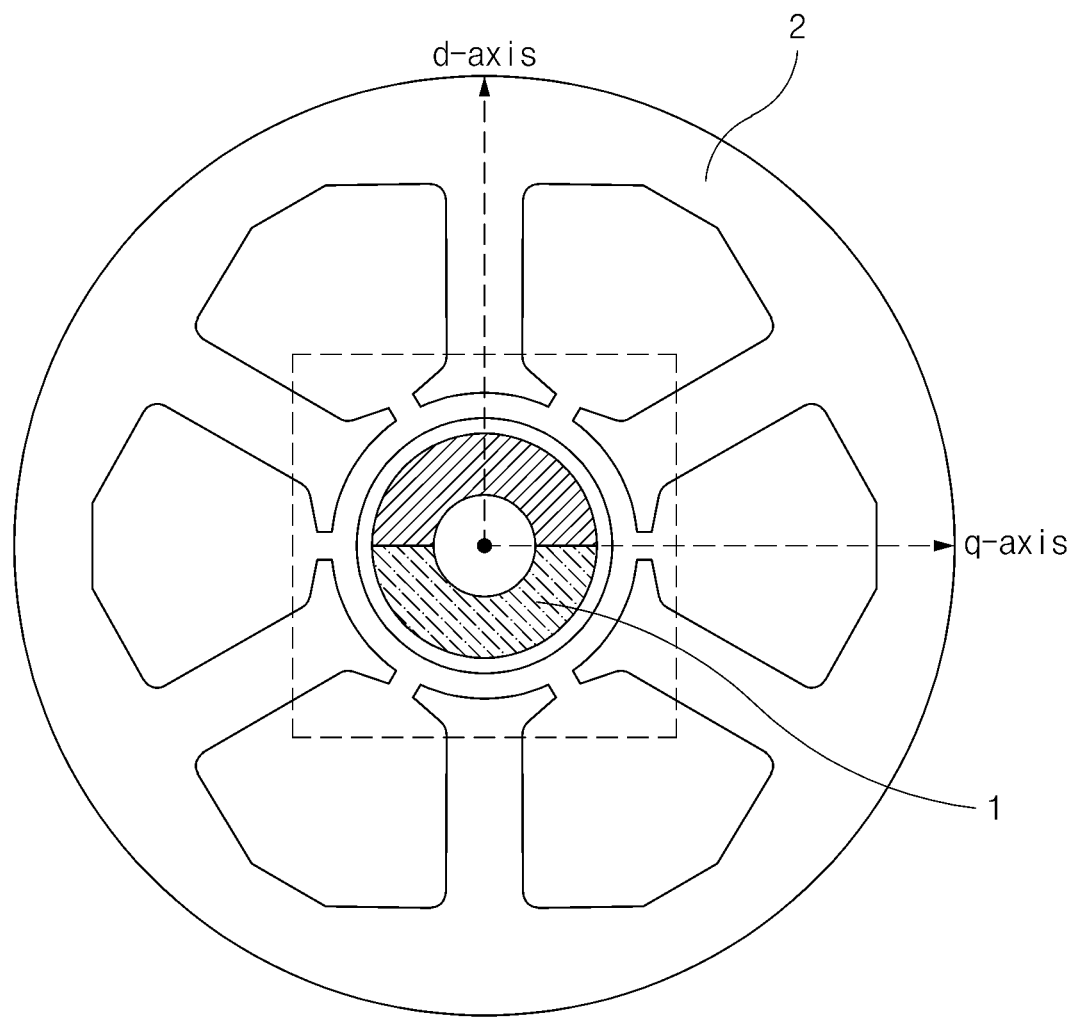
FIG. 1 is a view conceptually illustrating a conventional SPM type motor structure.

Hereinafter, some embodiments of the present disclosure will be described in detail with reference to the exemplary drawings. In providing reference numerals to the constituent elements of the drawings, the same elements may have the same reference numerals even if they are displayed on different drawings. Further, in the following description of the present disclosure, a detailed description of known functions and configurations incorporated herein will be omitted when it may make the subject matter of the present disclosure rather unclear.

Figure 2:
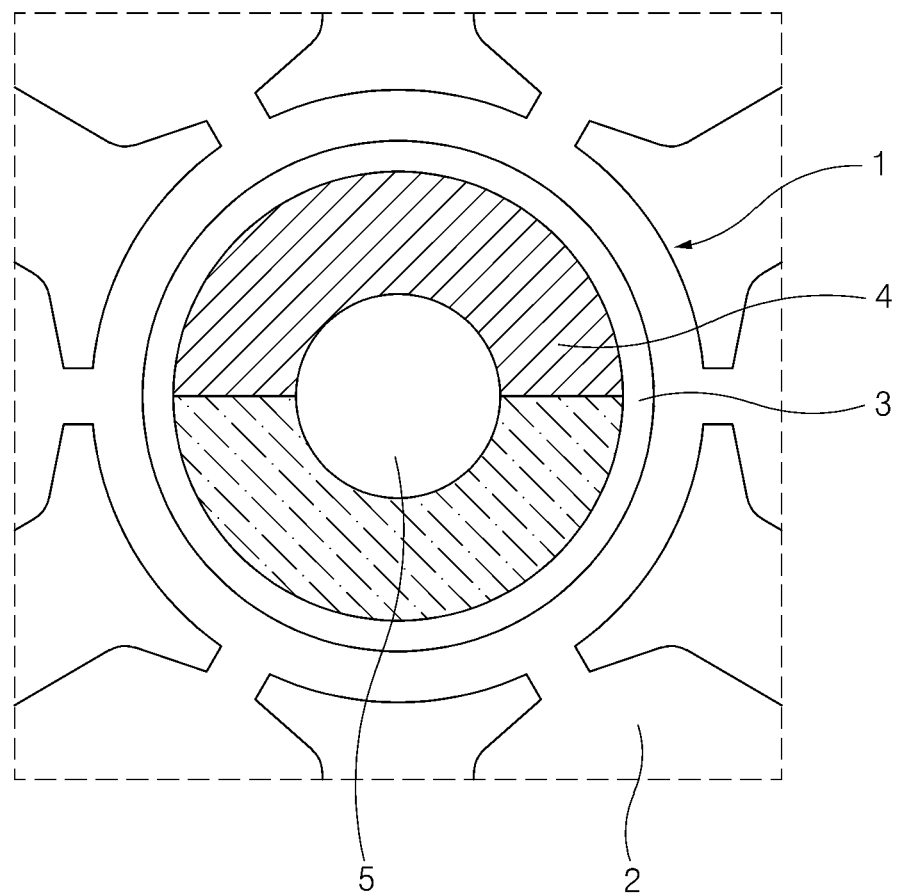
FIG. 2 is an enlarged view illustrating a dotted area of FIG. 1.
Figure 3:
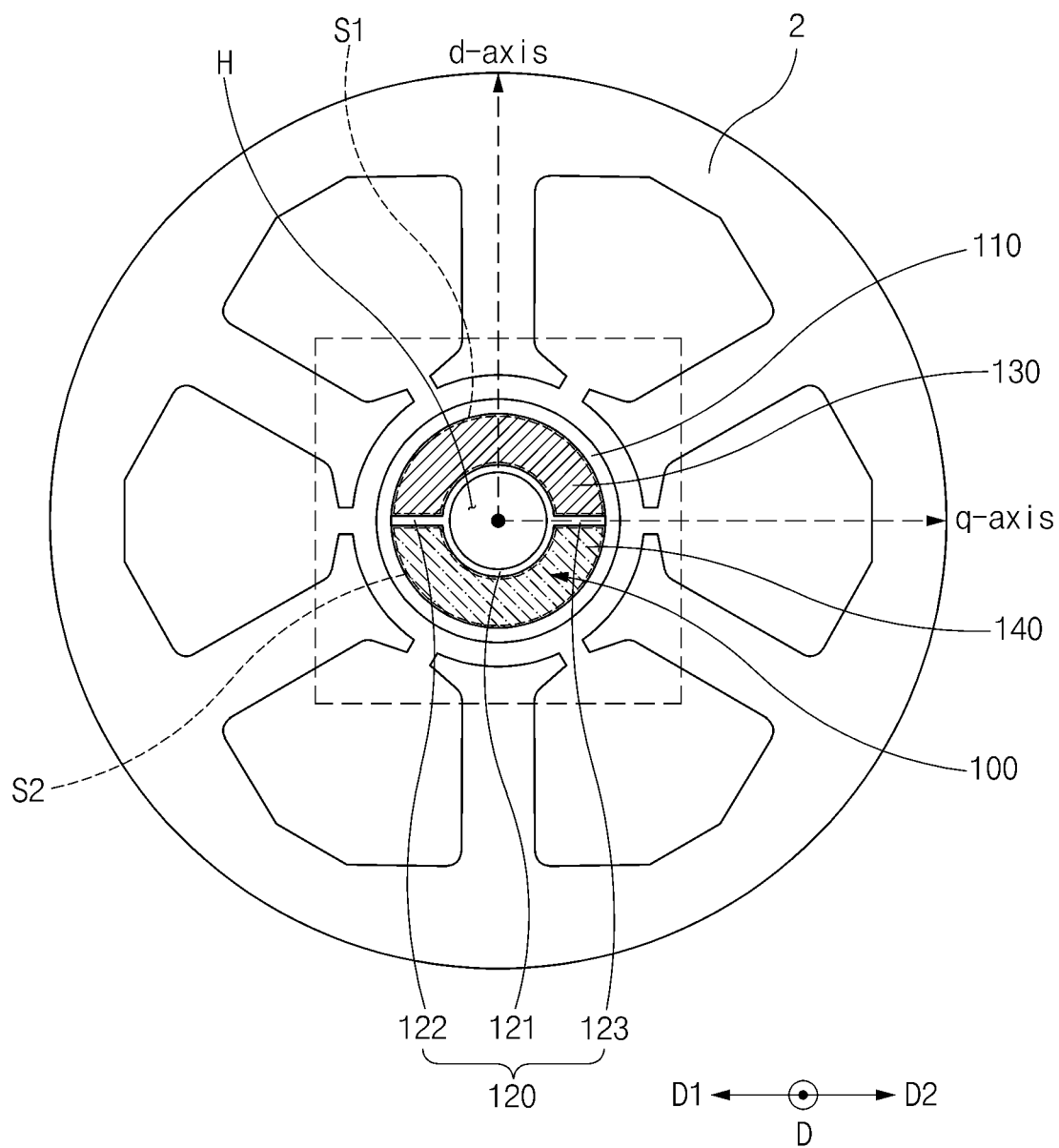
FIG. 3 is a view conceptually illustrating a motor including a rotor according to an embodiment of the present disclosure.

FIG. 1 is a view conceptually illustrating a conventional SPM type motor structure, and FIG. 2 is an enlarged view illustrating a dotted area of FIG. 1. Each of FIGS. 1-2 are discussed above in the Background section. FIG. 3 is a view conceptually illustrating a motor including a rotor according to an embodiment of the present disclosure. A rotor 100 according to an embodiment of the present disclosure may be a rotor that is applied to a motor. In more detail, the rotor according to an embodiment of the present disclosure may be a rotor that is applied to a surface permanent magnet (SPM) type motor. The rotor may be disposed inside a stator. Hereinafter, a detailed form of the rotor will be described in detail first.

<Rotor 100>

Figure 4:
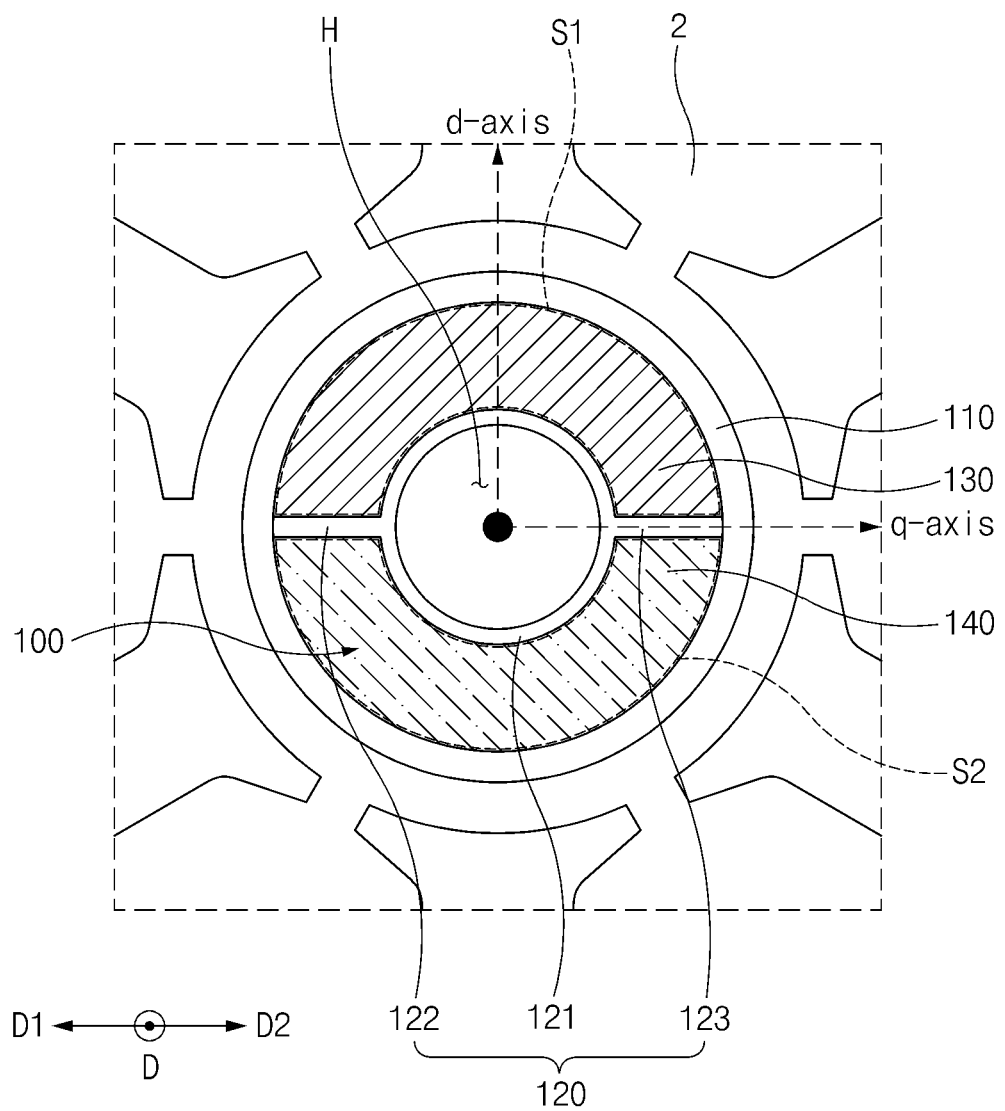
FIG. 4 is an enlarged view illustrating a dotted area of FIG. 3.
Figure 5:
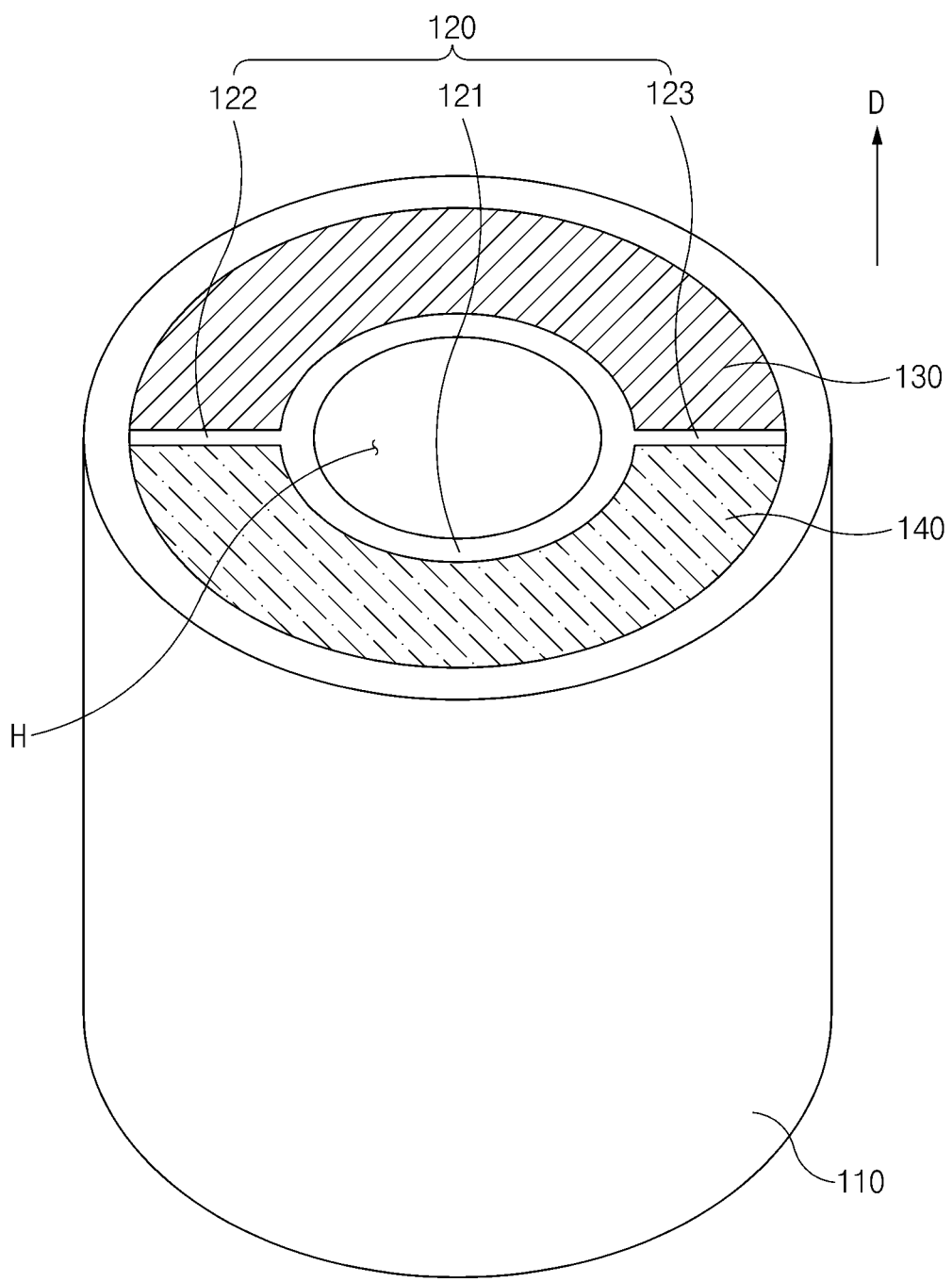
FIG. 5 is a perspective view conceptually illustrating a rotor according to an embodiment of the present disclosure.

FIG. 4 is an enlarged view illustrating a dotted area of FIG. 3. FIG. 4 is understood as illustrating the rotor 100 according to an embodiment of the present disclosure. FIG. 5 is a perspective view conceptually illustrating the rotor 100 according to an embodiment of the present disclosure.

The rotor 100 according to an embodiment of the present disclosure may include a sleeve part 110, a division part 120, a first magnet part 130, and a second magnet part 140. The sleeve part 110 may have a shape corresponding to a cylinder that extends in a reference direction "D". The sleeve part 110 may have an inner hole that extends in the reference direction "D", in an interior thereof. This may mean that the sleeve part 110 has a tubular shape. The sleeve part 110 may be a part for preventing spattering due to a centrifugal force when the first magnet part 130 and the second magnet part 140, which will be described below, are rotated.

The division part 120 may be disposed in the inner hole to divide the inner hole into a first space S1 and a second space S2, together with the sleeve part 110. The division part 120 may be a magnetic body. The division part 120 may be disposed between the first magnet part 130 and the second magnet part 140, which will be described below. To achieve this, the division part 120 may be inserted between the first magnet part 130 and the second magnet part 140 through a method such as interference fitting or shrinkage fitting.

The first magnet part 130 may be disposed in the first space S1. The second magnet part 140 may be disposed in the second space S2. The second magnet part 140 may be disposed to have a polarity that is opposite to a polarity of the first magnet part 130 when viewed in the reference direction "D". Here, the opposite polarity may mean that the polarity of the second magnet part 140 is the S pole when the polarity of the first magnet part 130 is the N pole and the polarity of the second magnet part 140 is the N pole when the polarity of the first magnet part 130 is the S pole when viewed in the reference direction "D".

Lengths of the sleeve part 110, the division part 120, the first magnet part 130, and the second magnet part 140 in the reference direction "D" may correspond to each other.

Because the rotor 100 according to an embodiment of the present disclosure includes the division part 120 that is a magnetic body between the first magnet part 130 and the second magnet part 140, there may be a difference between inductances of the d-axis and the q-axis, and thus the rotor 100 may have a saliency. Hereinafter, a detailed shape of the division part 120 that causes the difference between the inductances will be described in detail.

The division part 120 may include a first portion 121, a second portion 122, and a third portion 123. Here, the expressions of the first portion 121, the second portion 122, and the third portion 123 were made for explaining detailed shapes thereof, and the first portion 121, the second portion 122, and the third portion 123 do not necessarily need to be separate parts.

The first portion 121 may extend in the reference direction "D", and may have a shape corresponding to a cylinder having a diameter that is smaller than that of the inner hole. Furthermore, the first portion 121 may have a hole "H" that extends in the reference direction "D", in an interior thereof. That is, the first portion 121 may have a tubular shape. The hole "H" may be an empty space, but a shaft may be disposed in an interior of the hole "H". When the shaft is disposed in the interior of the hole "H", the rotor may further include a shaft.

The second portion 122 may extend from a first point that is one point on an outer peripheral surface of the first portion 121 in a first radial direction D1. The first radial direction D1 may mean one of radially outward directions of the first portion 121. With reference to FIG. 3, the first radial direction D1 may be a leftward direction.

The third portion 123 may extend from a second point in a second radial direction D2. The second point may be one point on the outer peripheral surface of the first portion 121, which is located in the second radial direction D2 of the first point. The second radial direction D2 may be an opposite direction to the first radial direction D1. With reference to FIG. 3, the second radial direction D2 may be a rightward direction. The second portion 122 and the third portion 123 may contact an inner peripheral surface of the sleeve part 110, and may divide the inner hole into the first space S1 and the second space S2.

Lengths of the first portion 121, the second portion 122, and the third portion 123 in the reference direction "D" may correspond to each other.

The second portion 122 and the third portion 123 may function to define a flux path in the q-axis. That is, the flux path may be formed in the q-axis through the second portion 122 that extends from the first portion 121 in the first radial direction D1 and the third portion 123 that extends from the first portion 121 in the second radial direction D2, and thus an inductance of the q-axis may be larger than an inductance of the d-axis.

The division part 120 of the rotor 100 according to an embodiment of the present disclosure may cause a difference between the inductances through the second portion 122 that extends from the first portion 121 in the first radial direction D1 and the third portion 123 that extends from the first portion 121 in the second radial direction D2, and thus the rotor may have a saliency.

Meanwhile, the division part 120 may divide the inner hole such that the shapes of the first space S1 and the second space S2 correspond to each other. Then, the first space S1 and the second space S2 may have shapes that are similar to shapes of areas between two semicircles having the same centers and different diameters. Because the first space S1 and the second space S2 are spaces of the inner hole, except for the division part 120, and particularly, areas occupied by the second portion 122 and the third portion 123, the semicircles described here may be partially different from the fan shape having a center angle of 180 degrees.

The first magnet part 130 may have a shape corresponding to the shape of the first space S1. Furthermore, the second magnet part 140 may have a shape corresponding to the shape of the second space S2.

Figure 6:
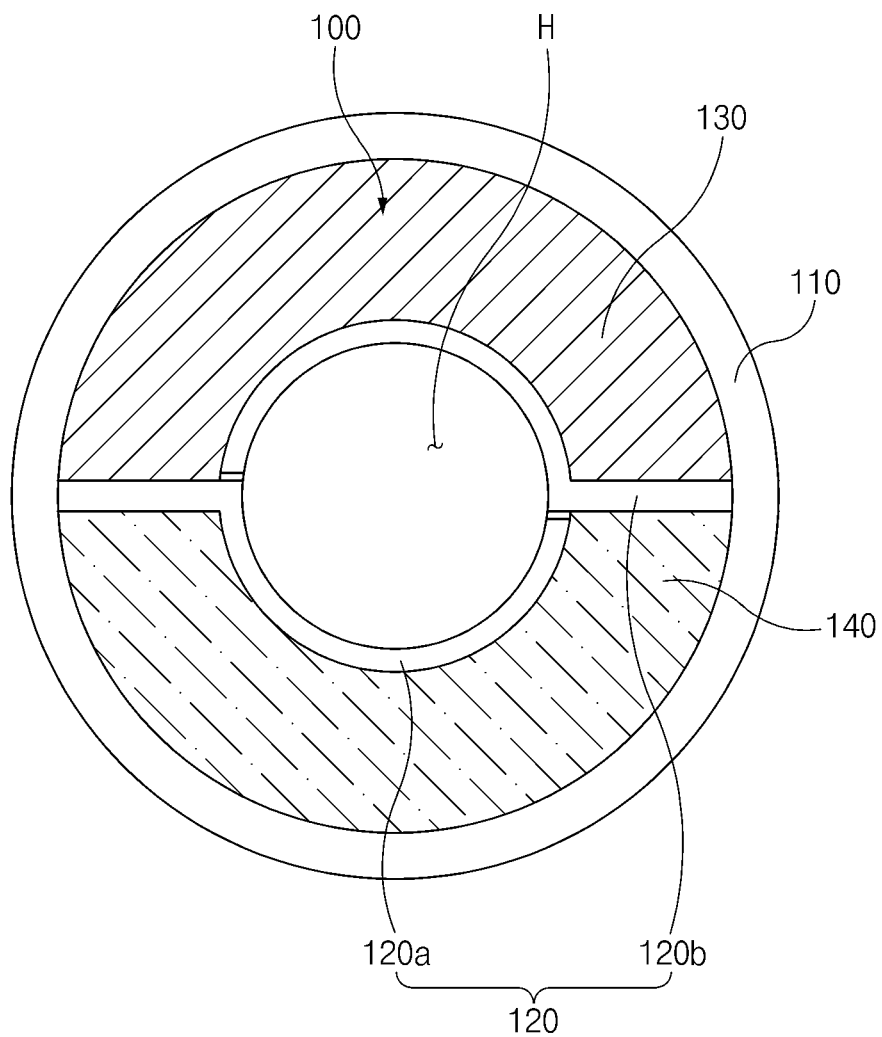
FIG. 6 is a view illustrating a rotor including a division part of another example.

The division part 120 may be formed by stacking electric steel plates. Then, it may not be easy to form the division part 120 due to the above-described shape of the division part 120. As another example of the division part for this, the division part 120 may include a first division member 120a and a second division member 120b. FIG. 6 is a view illustrating a rotor including a division part of another example.

The first division member 120a and the second division member 120b may be formed as separate objects. The first division member 120a and the second division member 120b may have corresponding shapes. Here, the corresponding shapes may mean that they are formed to be compatible with each other. Because the first division member 120a and the second division member 120b are formed to be compatible with each other, any one of the first division member 120a and the second division member 120b has to be produced while both of them do not need to be produced, whereby process efficiency may be increased and costs may be reduced.

As an example, the first division member 120a may include a portion of the first portion 121 and the second portion 122. The second division member 120b may include the remaining portions of the first portion 121, and the third portion 123.

As illustrated in FIG. 6, because the first division member 120a and the second division member 120b have shapes obtained by bending portions of a plate, they may be advantageously formed as compared with the integral shapes of the first to third portions 121, 122, and 123.

Figure 7:
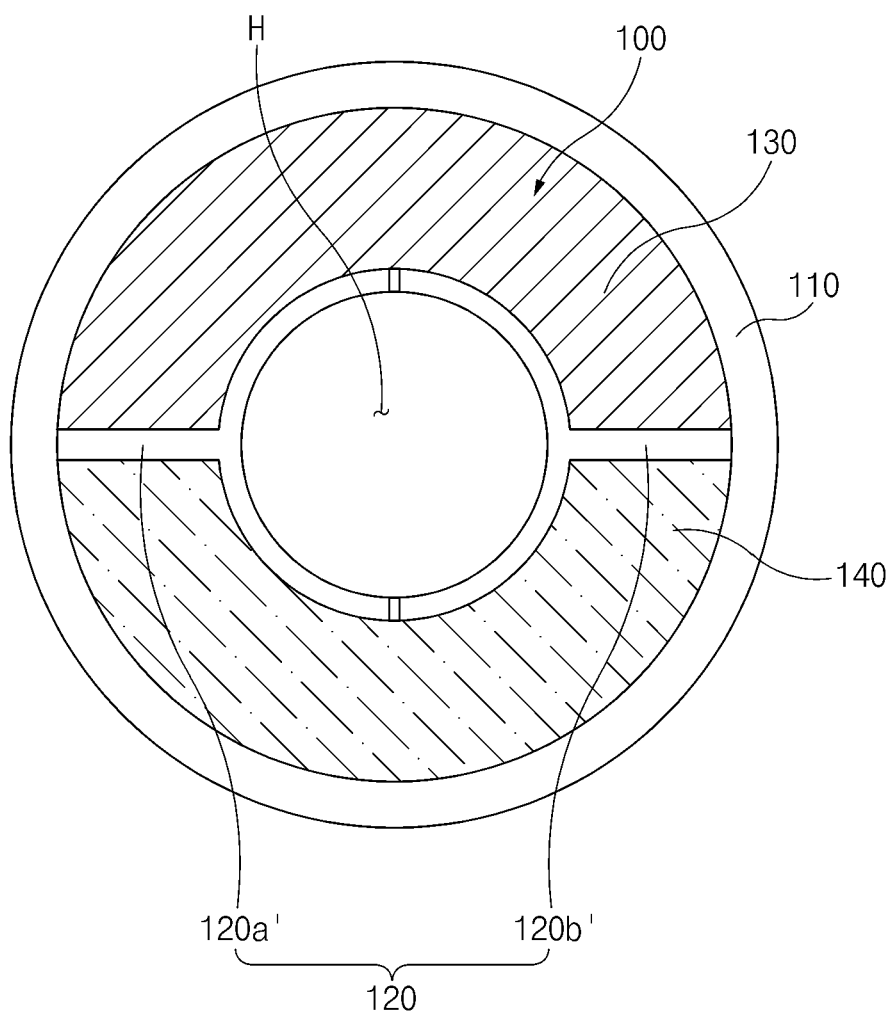
FIG. 7 is a view illustrating a rotor including a division part of another example.

FIG. 7 is a view illustrating a rotor including a division part of another example. In FIG. 7, a first division member 120a' and a second division member 120b' may have shapes that are similar to a Y shape.

Hereinafter, a thickness of the first portion 121 in a radial direction, and thicknesses of the second portion 122 and the third portion 123 will be described in detail. The thicknesses of the second portion 122 and the third portion 123 may mean lengths of the second portion 122 and the third portion 123 along an upward/downward direction with reference to FIG. 3. Hereinafter, the thickness of the first portion 121 in a radial direction will be referred to as x1, and the thicknesses of the second portion 122 and the third portion 123 will be referred to as x2, for convenience of description.

Figure 8:
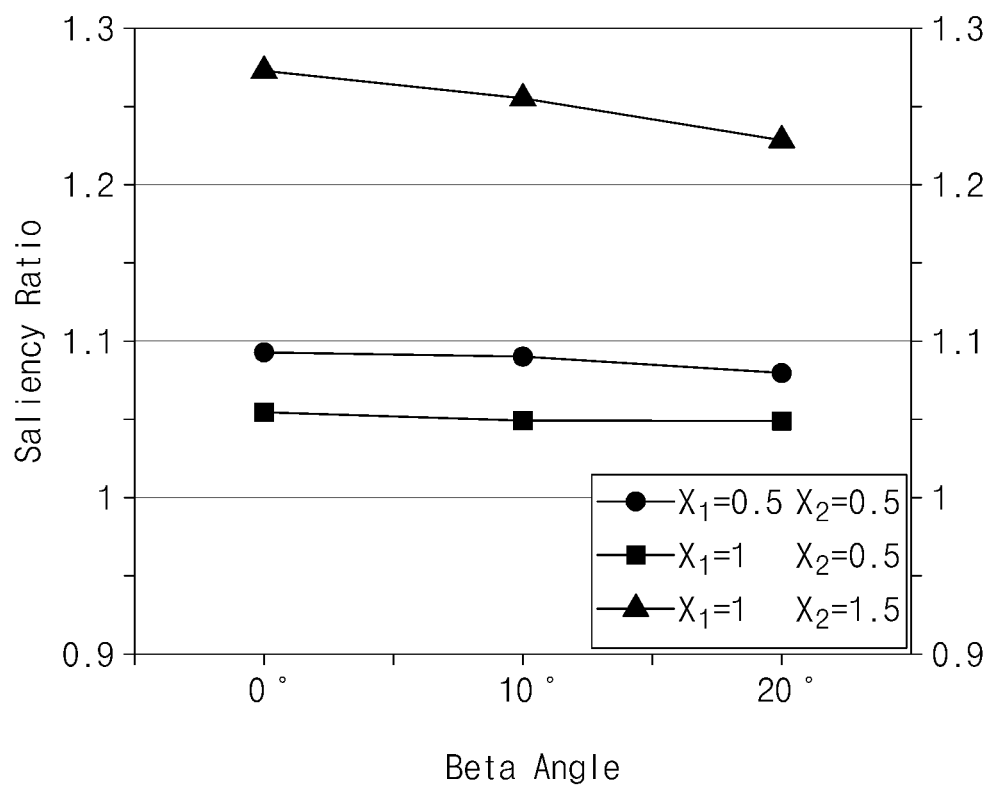
FIG. 8 is a graph depicting saliency ratios according to x1 and x2 values and a current phase angle.

FIG. 8 is a graph depicting saliency ratios according to x1 and x2 values and a current phase angle.

In FIG. 8, the x axis means a current phase angle, and the y axis means a saliency ratio. In a general high-speed motor, a core loss and an eddy current loss increase when the current phase angle is more than 10 degrees. Accordingly, it may be preferable that the current phase angle is 10 degrees or less.

Furthermore, an increase in the saliency ratio also may be a cause of increases in the core loss and the eddy current loss. However, when the saliency ratio is excessively low, the sensorless control may be impossible. Accordingly, it may be important to select a proper saliency ratio.

As illustrated in FIG. 8, when the x2 value is constant and the x1 value increases, the saliency ratio may decrease. Furthermore, when the x1 value is constant and the x2 value increases, the saliency ratio may increase. That is, to increase the saliency ratio, it may be preferable that the x2 value is increased and the x1 value is decreased.

In the rotor according to an embodiment of the present disclosure, it may be preferable that the saliency ratio is 1.1 or more. To acquire a saliency ratio of a desired value, it may be necessary to properly adjust the x1 value and the x2 value in consideration of the above-described proportional relationship. In FIG. 8, when x1 is 1 mm and x2 is 1.5 mm, the saliency ratio may be 1.1 or more.

Meanwhile, the thickness of the first portion 121 in the radial direction may be 0.9 mm to 1.1 mm. Furthermore, the thicknesses of the second portion 122 and the third portion 123 may be 1 mm to 1.5 mm. Hereinafter, a process of determining the thickness will be described in detail.

Figure 9:
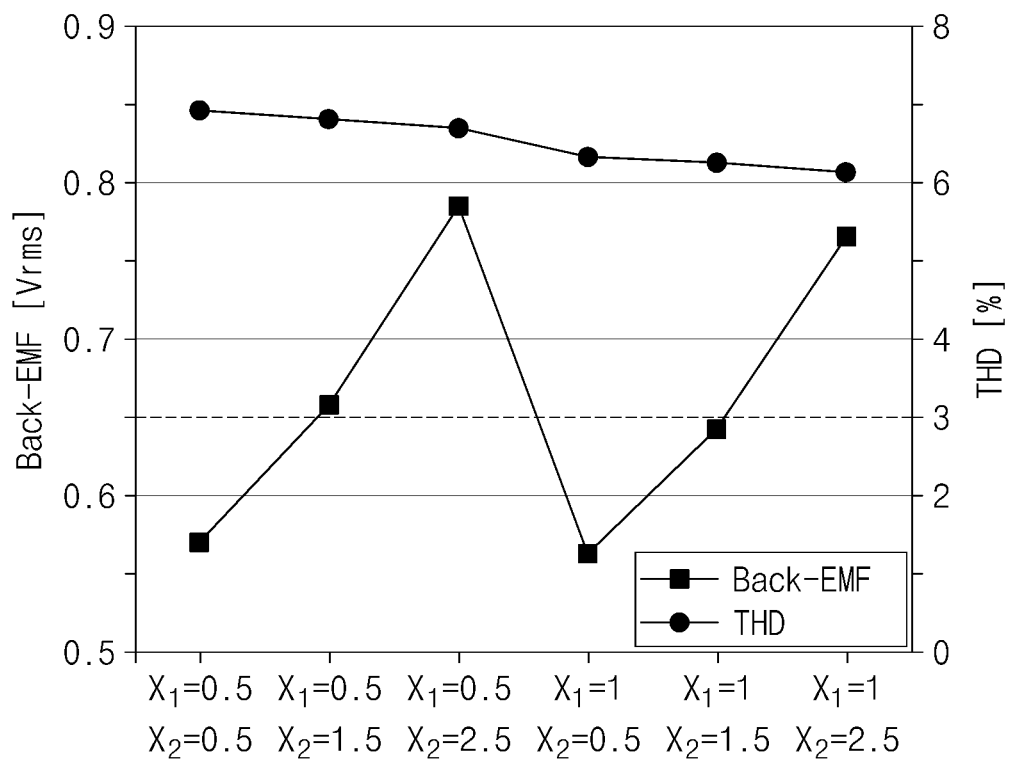
FIG. 9 is a graph depicting counter electro-motive forces and total harmonic distortions (THDs) according to x1 and x2 values.

FIG. 9 is a graph depicting counter electro-motive forces and total harmonic distortions (THDs) according to the x1 and x2 values. Hereinafter, the process of determining the x1 and x2 values in consideration of a counter electro-motive force and a THD will be described in detail.

In FIG. 9, the x axis means the x1 and x2 values, and the y axis means the counter electro-motive force and the THD. As illustrated in FIG. 9, the counter electro-motive force and the THD may decrease when x1 increases. Furthermore, when x2 increases, the counter electro-motive force may decrease but the THD may increase. The THD has to satisfy a design standard of 3% or less. A dotted line illustrated in FIG. 9 indicates a THD of 3%.

Referring to FIG. 9, for values that may satisfy a low counter electro-motive force and the THD of 3% or less, x1 may be 1 mm and x2 may be 1.5 mm. Accordingly, in FIG. 9, it may be understood that an optimum value may be obtained when x1 is 1 mm and x2 is 1.5 mm.

Meanwhile, to enhance a location estimation performance of the rotor according to an embodiment of the present disclosure, a signal-injection based sensorless control technique may be used. Hereinafter, the sensorless control method for estimating the location of the rotor having the above-described structure will be described below.

Figure 10:
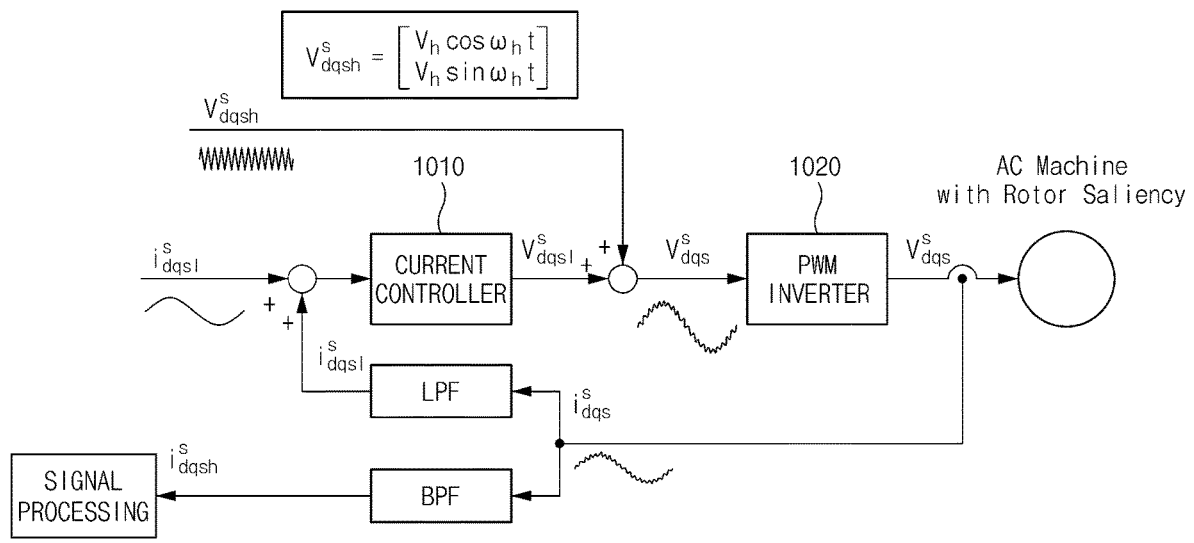
FIG. 10 is a block diagram of a sensorless control technique using injection of a high frequency in a sensorless control method for a rotor according to an embodiment of the present disclosure.

FIG. 10 is a block diagram of the sensorless control technique using injection of a high frequency in the sensorless control method for the rotor according to an embodiment of the present disclosure.

The symbols of the signal used in FIG. 10 will be described as follows.

$V_{dqsh}^{s*}$ means an injection voltage signal, and $V_{dqsl}^{s*}$ means a command voltage. Furthermore, $V_{dqs}^{s*}$ means a voltage command value, and $i_{dqsl}^{s*}$ means a command current. $i_{dqsh}^{s*}$ means a high frequency component current, and $i_{dqsl}^{s}$ means a basic wave component current. $V_{dqsh}^{s}$ means a stationary reference frame voltage, and $i_{dqs}^{s}$ means a stationary reference frame current.

Referring to FIG. 10, the sensorless control of the present disclosure is made by using a current controller 1010 and a PWM inverter 1020.

In the sensorless control technique using injection of a high frequency, a voltage signal of a high frequency is added to an output voltage command of the current controller 1010 and the PWM inverter 1020 synthesizes two voltages at once.

The high frequency voltage signal that rotates on the stationary reference frame may be injected when the voltage signal of the high frequency is added to the output voltage command of the current controller 1010, and the high frequency voltage signal may have a frequency in a range of 1/20 to 1/12 of the sampling frequency.

A feedback current of the current controller 1010 is obtained when the measured current passes through the low pass filter (LPF) to eliminate an influence of the applied high frequency voltage component. That is, an input signal of the current controller 1010 obtained by extracting a basic wave component current from the measured current signal by using the low pass filter is used.

Only a component by the applied high frequency voltage may be obtained to obtain the current for estimating the location and the velocity of the rotor by causing the measured current to pass through the band pass filter (BPF). That is, a current of a high frequency component for estimating the location of the rotor is extracted by using the band pass filter.

In the rotor according to an embodiment of the present disclosure, a difference between the inductances of the d-axis and the q-axis may be formed, and thus the rotor may have a saliency. In this case, a voltage equation on the stationary reference frame may be expressed as Equation 1 as follows.

$$V_{dqsh}^{s*} = \begin{bmatrix} V_h \cos \omega_h t \\ V_h \sin \omega_h t \end{bmatrix} \quad \text{[Equation 1]}$$

In Equation 1, $V_{dqsh}^{s*}$ means an applied voltage signal, $V_h$ means an applied high frequency voltage, and $\omega_h$ means a frequency of the high frequency voltage.

Figure 11:
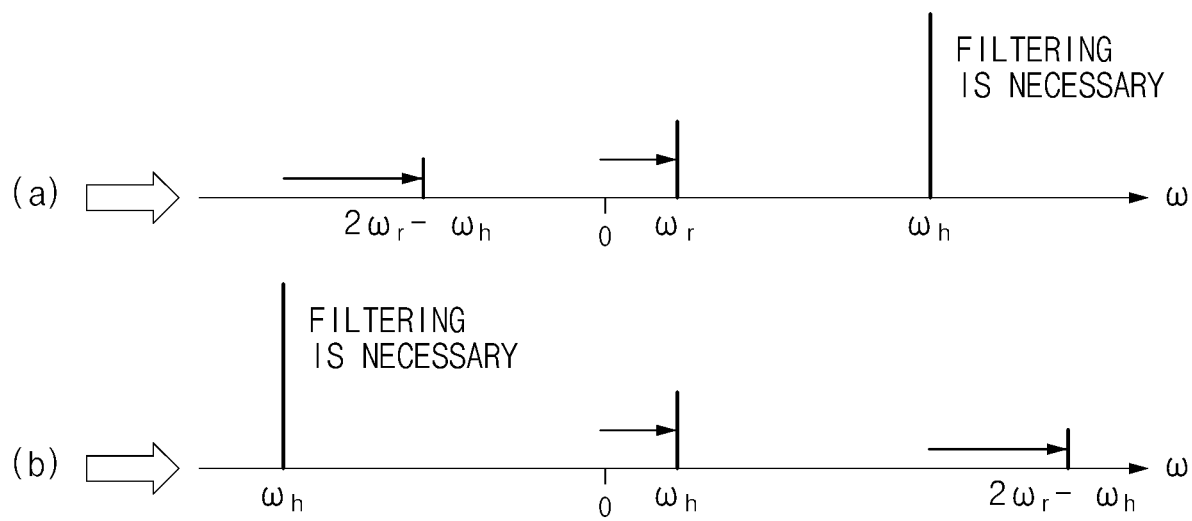
FIG. 11 is a view illustrating a frequency component when a high frequency voltage signal having a sign that is opposite to a sign of an input voltage signal is injected in a sensorless control method for a rotor according to an embodiment of the present disclosure.

FIG. 11 is a view illustrating a frequency component when a high frequency voltage signal having a sign that is opposite to a sign of an input voltage signal is injected in the sensorless control method for the rotor according to an embodiment of the present disclosure.

FIG. 11A illustrates a frequency component when a high frequency voltage signal having the same sign as that of an input voltage signal is injected according to a conventional scheme.

Referring to FIG. 11A, when an ultra-high speed rotation device is operated in a signal injection sensorless control scheme, a frequency ($\omega_r$) of a basic wave voltage is high at a low velocity, and thus locations of the frequency component of the basic wave voltage and the frequency ($\omega_h$) component of the high frequency voltage may be close. In this case, as the locations of the frequency component of the basic wave voltage and the frequency component of the high frequency voltage become closer, an error of the estimation of the location of the rotor may be alleviated.

FIG. 11B illustrates a frequency component when a high frequency voltage signal having the same sign as that of an input voltage signal is injected according to a conventional scheme.

Referring to FIG. 11B, when the high frequency voltage signal having the opposite sign to the sign of the input voltage signal is injected, the frequency ($\omega_r$) component of the basic wave voltage and the frequency ($\omega_h$) component of the high frequency voltage may become farther according to an operation velocity of the rotor. In this case, as the locations of the frequency component of the basic wave voltage and the frequency component of the high frequency voltage become farther, the estimation performance of the location of the rotor may be enhanced.

For example, in the sensorless control, when the high frequency voltage signal having the opposite sign to the sign of the input voltage signal is injected, almost regular estimation performances may be shown from a zero velocity to 6000 rpm.

Figure 12:
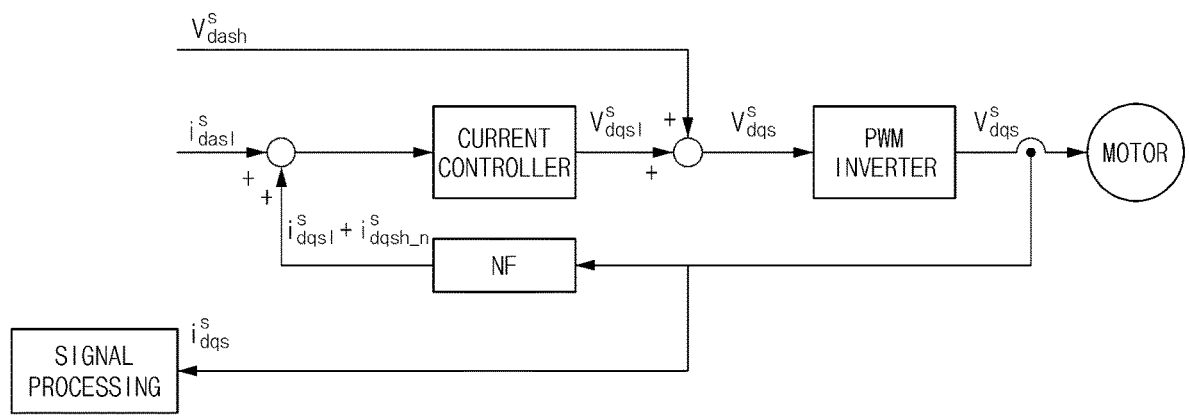
FIG. 12 is a conceptual view illustrating a current control of a sensorless algorithm in a sensorless control method for a rotor according to an embodiment of the present disclosure.

FIG. 12 is a conceptual view illustrating a current control of a sensorless algorithm in the sensorless control method for the rotor according to an embodiment of the present disclosure.

Referring to FIG. 12, in the sensorless control technique using injection of a high frequency, the feedback current of the current controller may be acquired by eliminating a frequency ($\omega_h$) component of the high frequency voltage with a notch filter.

According to an embodiment, because the velocity of the rotor is increased by injecting the high frequency voltage signal having the opposite sign to the sign of the input voltage signal, a stable current control may become possible.

Figure 13:
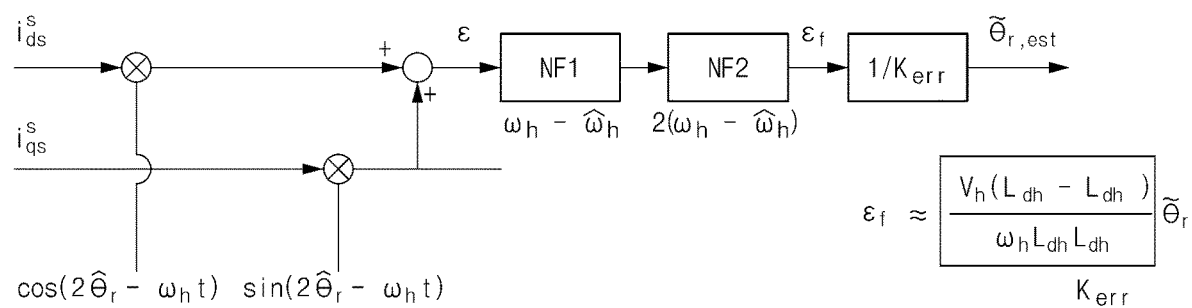
FIG. 13 is a view illustrating a signal processing technique using a heterodyne scheme in a sensorless control method for a rotor according to an embodiment of the present disclosure.

FIG. 13 is a view illustrating a signal processing technique using a heterodyne scheme in the sensorless control method for the rotor according to an embodiment of the present disclosure.

Referring to FIG. 13, a signal including a location estimation error of the rotor may be obtained as in Equation 2 by performing signal processing using a heterodyne scheme on a current.

$$\varepsilon = -i_{qc}^s \sin(\omega_h t - \hat{\theta}_r) +$$
$$\frac{V_h(L_{dh} + L_{qh})}{2\omega_h L_{dh} L_{qh}} \sin 2(\omega_h t - \hat{\theta}_r) + \frac{V_h(L_{dh} - L_{qh})}{2\omega_h L_{dh} L_{qh}} \sin 2(\theta_r - \hat{\theta}_r)$$

[Equation 2]

In Equation 2, $\varepsilon$ means a signal including the location estimation error of the rotor.

$\varepsilon$ includes both of a DC component and a high frequency component. In this case, the DC component includes error information, and the high frequency component does not include error information.

Because the high frequency component does not include information, interruption frequencies may be eliminated by using two updated notch filters according to the estimation velocity.

When a high frequency component is eliminated from a signal including the location estimation error of the rotor of Equation 2 by using the notch filter, it may be expressed in Equation 3 as follows.

$$\varepsilon_f \approx \frac{V_h(L_{dh} - L_{qh})}{\omega_h L_{dh} L_{qh}} \tilde{\theta}_r$$

[Equation 3]

It may be seen that the signal obtained as a final output of the signal processing from Equation 3 is proportional to the location estimation error of the rotor and the magnitude of the signal is related to the magnitude and frequency of the applied voltage, the difference between the inductances, and the like, and the location of the rotor may be estimated by making it zero. In FIG. 13, $K_{err}$ means the same value as $$\frac{V_h(L_{dh} - L_{qh})}{\omega_h L_{dh} L_{qh}}$$

of Equation 3.

Figure 14:
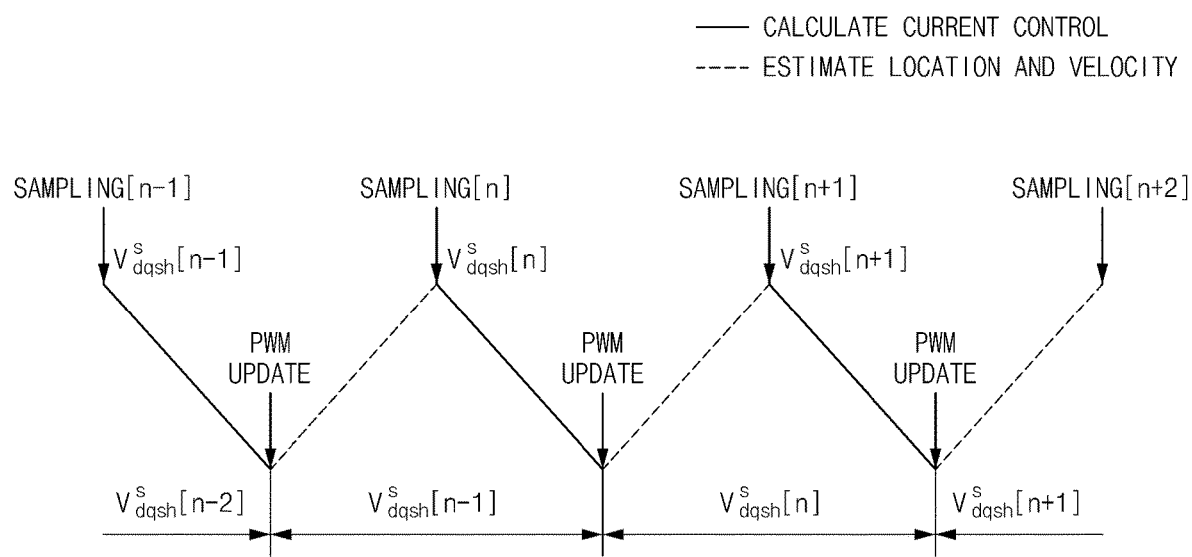
FIG. 14 is a view illustrating a sampling scheme in a sensorless control method for a rotor according to an embodiment of the present disclosure.

FIG. 14 is a view illustrating a sampling scheme in the sensorless control method for the rotor according to an embodiment of the present disclosure.

Referring to FIG. 14, the sensorless control method for the rotor according to an embodiment may include an operation of distributing a sensorless algorithm in consideration of the sampling scheme for controlling a current of the rotor.

According to an embodiment of the present disclosure, in the sampling for controlling the current of the rotor, a calculation time period from a time point for the sampling to a pulse width modulation (PWM) update time point may be set to be less than 25 µs.

According to an embodiment of the present disclosure, in the sampling for controlling the current of the rotor, a signal processing and location estimation algorithm may be performed after the PWM update to secure a calculation time period for the current control.

According to an embodiment, in the sampling for controlling the current of the rotor, a sampling time period between an operation time point of the location estimation algorithm and a current control time point using an estimated location of the rotor may be calibrated to the estimated location to calibrate the error that occurs during the current sampling.

According to the present disclosure, because a magnetic body is inserted between permanent magnets that constitute the rotor, the rotor may have a saliency, whereby a sensorless control for rotating the rotor only in a specific direction based on the saliency may become possible.

Furthermore, according to the present disclosure, because the high frequency voltage signal having an opposite sign to the sign of the input voltage signal is injected, a sensorless control having an enhanced location estimation performance and an enhanced current control performance may be made.

The above description is a simple exemplification of the technical spirits of the present disclosure, and the present disclosure may be variously corrected and modified by those skilled in the art to which the present disclosure pertains without departing from the essential features of the present disclosure. Accordingly, the embodiments disclosed in the present disclosure is not provided to limit the technical spirits of the present disclosure but provided to describe the present disclosure, and the scope of the technical spirits of the present disclosure is not limited by the embodiments. Accordingly, the technical scope of the present disclosure should be construed by the attached claims, and all the technical spirits within the equivalent ranges fall within the scope of the present disclosure.

What is claimed is:
1. A rotor, comprising:
a sleeve part having a shape corresponding to a cylinder and extending lengthwise in a reference direction, and having an inner hole in an interior thereof and extending in the reference direction;

a division part disposed in the inner hole, and being configured to divide the inner hole into a first space and a second space;
a first magnet part disposed in the first space; and
a second magnet part disposed in the second space,
wherein, when viewed along the reference direction, the second magnet part is disposed to have an opposite polarity to that of the first magnet part.

2. The rotor of claim 1, wherein the division part further includes:
a first portion extending in the reference direction and having a shape corresponding to a cylinder having a diameter that is smaller than a diameter of the inner hole, the first portion having a hole extending in the reference direction in an interior thereof;
a second portion extending in a first radial direction from a first point at an outer peripheral surface of the first portion; and
a third portion extending in a second radial direction from a second point at the outer peripheral surface of the first portion,
wherein the second radial direction is an opposite direction to the first radial direction.

3. The rotor of claim 2, wherein the second portion and the third portion contact an inner peripheral surface of the sleeve part and divide the inner hole into the first space and the second space.

4. The rotor of claim 2, wherein a thickness of the first portion in a radial direction is 0.9 mm to 1.1 mm, and
wherein thicknesses of the second portion and the third portion are 1 mm to 1.5 mm.

5. The rotor of claim 2, wherein lengths of the first portion, the second portion, and the third portion in the reference direction correspond to each other.

6. The rotor of claim 2, wherein the division part further includes:
a first division member including a portion of the first portion and the second portion; and
a second division member including remaining portions of the first portion, and the third portion, and
wherein the first division member and the second division member are formed as separate objects.

7. The rotor of claim 6, wherein the first division member and the second division member have corresponding shapes.

8. The rotor of claim 1, wherein the division part is configured to divide the inner hole such that shapes of the first space and the second space correspond to each other.

9. The rotor of claim 1, wherein the first magnet part has a shape corresponding to the shape of the first space, and the second magnet part has a shape corresponding to the shape of the second space.

10. The rotor of claim 1, wherein lengths of the sleeve part, the division part, the first magnet part, and the second magnet part in the reference direction correspond to each other.

11. A sensorless control method for a rotor, comprising:
providing the rotor of claim 1;
injecting a first voltage signal having a first sign;
injecting a second voltage signal having a second sign that is opposite to the first sign; and
estimating a location of the rotor by injecting the first voltage signal and the second voltage signal,
wherein the second voltage signal is a signal that has a frequency that is higher than that of the first voltage signal.

12. The sensorless control method of claim 11, wherein the injecting of the second voltage signal step further includes:
injecting the second voltage signal to axis d-q of a stationary reference frame.

13. The sensorless control method of claim 11, wherein the injecting of the second voltage signal step further includes:
injecting a voltage signal having a frequency in a range of $1/20^{th}$ to $1/12^{th}$ of a sampling frequency.

14. The sensorless control method of claim 11, further comprising:
extracting a basic wave component current from a measured current signal by using a low pass filter (LPF); and
using a signal acquired by the low pass filter as an input signal of a current controller.

15. The sensorless control method of claim 11, further comprising:
extracting a current of a high frequency component for estimating the location of the rotor from a measured current signal by using a band pass filter (BPF).

16. The sensorless control method of claim 11, further comprising:
acquiring a signal including a location estimation error of the rotor by using a heterodyne method.

17. The sensorless control method of claim 16, further comprising:
eliminating a high frequency component from the signal including the location estimation error of the rotor by using a notch filter; and
estimating the location of the rotor by using a signal acquired by eliminating the high frequency component.

18. The sensorless control method of claim 11, wherein a calculation time period from a time point of sampling for controlling a current of the rotor to a time point for a pulse width modulation (PWM) update is 25 μs or less.

19. The sensorless control method of claim 18, further comprising:
operating a location estimation algorithm of the rotor after the PWM update.

20. The sensorless control method of claim 19, further comprising:
calibrating a sampling time period between an operation time point of the location estimation algorithm and a current control time point using an estimated location of the rotor to the estimated location.

\* \* \* \* \*